J. K. BABCOCK.
WIND-MILL.
No. 6,743. Reissued Nov. 16, 1875.
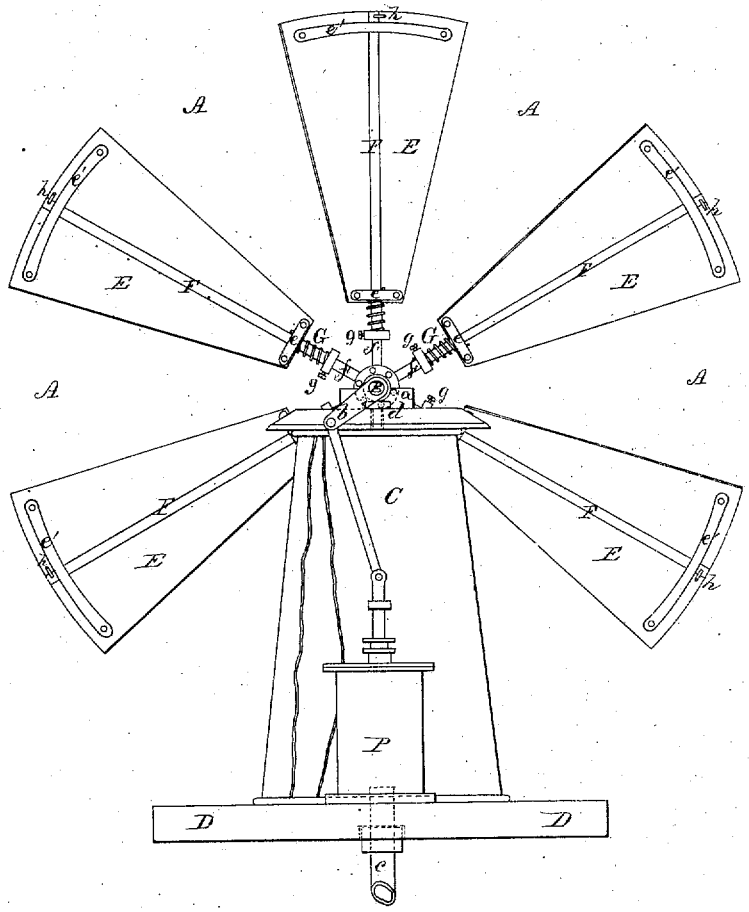
Witnesses.
Wendell R. Curtis
John T. Peters
Inventor.
Gaber K. Babcock
by Theo. G. Ellis Attorney
THE NORRIS PETERS CO., WASHINGTON, D. C.

UNITED STATES PATENT OFFICE.

JABEZ K. BABCOCK, OF PHELPS, NEW YORK, ASSIGNOR TO THE HARTFORD PUMP COMPANY.

IMPROVEMENT IN WINDMILLS.

Specification forming part of Letters Patent No. 30,038, dated September 18, 1860; extended seven years; reissue No. 6,743, dated November 16, 1875; application filed October 29, 1875.

*To all whom it may concern:*

Be it known that I, JABEZ K. BABCOCK, of Phelps, in the county of Ontario and State of New York, have invented certain new and useful Improvements in Windmills; and I do hereby declare that the following is a full, clear, and exact description thereof, whereby a person skilled in the art can make and use the same, reference being had to the accompanying drawing, and to the letters of reference marked thereon.

Said drawing represents a rear elevation of my invention.

My invention consists in combining, with a wind-wheel, a hollow air-tight receiver, which is shown in the drawing as a rotary tower, made hollow and air-tight. Into this receiver the air is compressed by a suitable air-pump connected with the wind-wheel. When the receiver is made in the form of a rotary tower the central axis is made hollow, for the purpose of drawing off the air, which has been compressed within it. When arranged as shown in the drawing the pump is attached to the rotary receiver, and turns with it and the wind-wheel.

In the accompanying drawing, A is the wind-wheel, which is firmly attached to a shaft, B. This has its bearings in boxes of usual construction on top of the tower C, and is provided with a crank, *b*, for operating the air-pump P, which may be of any usual construction. The hollow tower or reservoir C is made of sheet iron, or any other material which will resist the required pressure. It rests upon a platform, D, and rotates upon the hollow central axis *c*, which serves as an exit-pipe for the compressed air. The tower, with its appendages, is made to turn easily upon the platform D, and may be placed upon friction-rollers, to facilitate its rotary motion. The object of this motion is to permit the wind-wheel to be turned toward the direction of the wind by means of a suitable vane. The receiver or tower C is provided with a safety-valve, *d*, to provide against an excess of pressure, and the exit-pipe *c* to convey the compressed air to where it is to be used. The sails or wings E of the wind-wheel are attached to the arms F by means of loops *e e'*, which allow the wings to turn freely upon the arms, and these loops are a little to one side of the center of the wings, so that when exposed to the wind they have a tendency to turn edgewise, and produce no revolving motion.

In order to keep the wings in the proper position the springs G are used, the outer ends of which are attached to the loops *e*, while their inner ends are connected to the heads *f*, which are adjustable upon the arms by means of the set-screws *g*. Stops *h* on the outer ends of the arms prevent the wings turning back any farther than may be desirable. With an ordinary wind the sails or wings retain their position against the stops *h*, but if the wind is too strong they turn against the springs G, yield, and thus prevent injury to the machinery. The required tension is given to the springs G by the adjustment of the heads *f*, which are fixed in any desired position by means of the set-screws *g*.

What I claim as my invention is—

1. The combination of the wind-wheel A, the air-pump P, and the reservoir for compressed air C, substantially as described.

2. The hollow rotary tower C, with its tubular axis *c*, in combination with the wind-wheel A, substantially as herein described.

JABEZ K. BABCOCK.

Witnesses:

LYSANDER REDFIELD,
ALBERT L. BOYDEN.